(12) United States Patent
Kim et al.

(10) Patent No.: US 10,541,447 B2
(45) Date of Patent: Jan. 21, 2020

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Chem, Ltd., Seoul (KR)

(72) Inventors: Gwang Yeon Kim, Daejeon (KR); Young Min Lim, Daejeon (KR); Ha Eun Kim, Daejeon (KR); Chul Haeng Lee, Daejeon (KR)

(73) Assignee: LG Chem, Ltd. (KR)

( * ) Notice: Subject to any disclaimer, the term of this patent is extended or adjusted under 35 U.S.C. 154(b) by 16 days.

(21) Appl. No.: 16/070,957

(22) PCT Filed: Nov. 15, 2017

(86) PCT No.: PCT/KR2017/012966
§ 371 (c)(1),
(2) Date: Jul. 18, 2018

(87) PCT Pub. No.: WO2018/093152
PCT Pub. Date: May 24, 2018

(65) Prior Publication Data
US 2019/0020063 A1 Jan. 17, 2019

(30) Foreign Application Priority Data

Nov. 15, 2016 (KR) .................. 10-2016-0151998
Nov. 15, 2017 (KR) .................. 10-2017-0152232

(51) Int. Cl.
*H01M 10/0567* (2010.01)
*H01M 10/0569* (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC .. H01M 10/0567; H01M 4/505; H01M 4/525; H01M 10/0525; H01M 10/0568; H01M 10/0569; H01M 10/4235
See application file for complete search history.

(56) References Cited

U.S. PATENT DOCUMENTS

| 8,986,880 B2 | 3/2015 | Odani et al. |
| 2010/0015514 A1 | 1/2010 | Miyagi et al. |

(Continued)

FOREIGN PATENT DOCUMENTS

| JP | 2013016456 A | 1/2013 |
| JP | 2015064991 A | 4/2015 |

(Continued)

OTHER PUBLICATIONS

Search report from International Application No. PCT/KR2017/012966, dated Mar. 26, 2018.

(Continued)

*Primary Examiner* — Helen Oi K Conley
(74) *Attorney, Agent, or Firm* — Lerner, David, Littenberg, Krumholz & Mentlik, LLP

(57) ABSTRACT

The present invention relates to a non-aqueous electrolyte solution for a lithium secondary battery and a lithium secondary battery including the same, and particularly, to a non-aqueous electrolyte solution for a lithium secondary battery which includes an ionizable lithium salt, an organic solvent, and an additive, wherein the additive is a mixed additive which includes lithium difluorophosphate, tertiary alkylbenzene, and tetra-vinyl silane in a weight ratio of 1:1 to 4:0.05 to 0.5, and the additive is included in an amount of 2.5 wt % to 4.5 wt % based on a total weight of the non-aqueous electrolyte solution for a lithium secondary battery, and a lithium secondary battery including the same.

11 Claims, 2 Drawing Sheets

(51) Int. Cl.
  *H01M 10/42* (2006.01)
  *H01M 4/505* (2010.01)
  *H01M 4/525* (2010.01)
  *H01M 10/0568* (2010.01)
  *H01M 10/0525* (2010.01)

(52) U.S. Cl.
  CPC ... *H01M 10/0525* (2013.01); *H01M 10/0568* (2013.01); *H01M 10/0569* (2013.01); *H01M 10/4235* (2013.01); *H01M 2300/0025* (2013.01)

(56) References Cited

U.S. PATENT DOCUMENTS

| | | |
|---|---|---|
| 2012/0316716 A1 | 12/2012 | Odani et al. |
| 2015/0010811 A1 | 1/2015 | Egorov et al. |
| 2015/0118580 A1 | 4/2015 | Kondo et al. |
| 2016/0211553 A1 | 7/2016 | Ito et al. |
| 2017/0222264 A1 | 8/2017 | Morinaka et al. |

FOREIGN PATENT DOCUMENTS

| | | | |
|---|---|---|---|
| JP | 2016035820 A | 3/2016 | |
| KR | 20150006364 A | 1/2015 | |
| KR | 20160044056 A | 4/2016 | |
| WO | 2013187380 A1 | 12/2013 | |

OTHER PUBLICATIONS

Extended European Search Report including Written Opinion for Application No. EP17871248.5 dated Feb. 15, 2019.

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2017/012966, filed Nov. 15, 2017, which claims priority to Korean Patent Application Nos. 10-2016-0151998, filed Nov. 15, 2016, and Korean Patent Application No. 10-2017-0152232, filed Nov. 15, 2017, the disclosures of which are incorporated herein by reference.

TECHNICAL FIELD

The present invention relates to a non-aqueous electrolyte solution for a lithium secondary battery and a lithium secondary battery including the same, and particularly, to a non-aqueous electrolyte solution for a lithium secondary battery, which may improve high-temperature durability and stability of the lithium secondary battery, and a lithium secondary battery including the same.

BACKGROUND ART

Demand for secondary batteries as an energy source has been significantly increased as technology development and demand with respect to mobile devices have increased, and, among these secondary batteries, lithium secondary batteries having high energy density and high voltage have been commercialized and widely used.

Charge and discharge of the lithium secondary battery is performed while a process of intercalating and deintercalating lithium ions from a lithium metal oxide positive electrode into and out of a carbon negative electrode is repeated.

In this case, since the lithium ions are highly reactive, the lithium ions react with the carbon electrode to form $Li_2CO_3$, LiO, or LiOH, and thus, a film may be formed on the surface of the negative electrode. The film is denoted as "solid electrolyte interface (SEI) film". The SEI film formed at an initial stage of charging may prevent a reaction of the lithium ions with the carbon negative electrode or other materials during charge and discharge, and may act as an ion tunnel that only passes the lithium ions between an electrolyte solution and the negative electrode. The ion tunnel may prevent the collapse of a structure of the carbon negative electrode due to the co-intercalation of the carbon negative electrode and organic solvents of the non-aqueous electrolyte solution having a high molecular weight which solvates the lithium ions and moves therewith.

In a case in which the organic solvent used in the non-aqueous electrolyte solution of the lithium secondary battery is generally stored for a long period of time at high temperature, gas is generated while the organic solvent is oxidized by a transition metal oxide discharged from the positive electrode, and battery swelling and electrode assembly deformation occur due to the gas thus generated. Furthermore, the negative electrode is exposed while the SEI film is gradually collapsed during high-temperature storage in a fully charged state (e.g., storage at 60° C. after charged to 100% at 4.2 V), and, since gases, such as CO, $CO_2$, $CH_4$, and $C_2H_6$, are generated while the negative electrode thus exposed reacts with the electrolyte solution to continuously cause a side reaction, deformation, such as battery swelling, due to an increase in battery internal pressure may eventually occur. When the battery is deteriorated due to internal short circuit of the battery which is caused by the battery deformation, fire or explosion of the battery may occur.

In order to address these limitations, a method of adding an SEI forming material for preventing the collapse of the SEI film in the non-aqueous electrolyte solution has been proposed. However, another limitation has occurred in which overall performance of the secondary battery is reduced while there are other side effects due to the electrolyte solution additive.

Thus, there is a continuous need to develop a non-aqueous electrolyte solution with a new configuration which may improve high-temperature and overcharge stability of the lithium secondary battery while minimizing the side effects.

PRIOR ART DOCUMENT

U.S. Pat. No. 8,986,880

DISCLOSURE OF THE INVENTION

Technical Problem

An aspect of the present invention provides a non-aqueous electrolyte solution for a lithium secondary battery including an additive which may reduce interfacial resistance of a surface of an electrode and may simultaneously suppress an electrolyte solution side reaction during high-temperature storage.

Another aspect of the present invention provides a lithium secondary battery in which high-temperature storage characteristics and high-temperature life characteristics are improved by including the non-aqueous electrolyte solution for a lithium secondary battery.

Technical Solution

According to an aspect of the present invention, there is provided a non-aqueous electrolyte solution for a lithium secondary battery including an ionizable lithium salt, an organic solvent, and an additive, wherein the additive is a mixed additive which includes lithium difluorophosphate (LiDFP), tertiary alkylbenzene represented by Formula 1, and tetra-vinyl silane (TVS) in a weight ratio of 1:1 to 4:0.05 to 0.5, and the additive is included in an amount of 2.5 wt % to 4.5 wt % based on a total weight of the non-aqueous electrolyte solution for a lithium secondary battery:

[Formula 1]

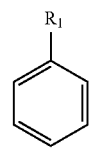

wherein, in Formula 1, $R_1$ is a tertiary alkyl having 4 to 5 carbon atoms.

In the non-aqueous electrolyte solution for a lithium secondary battery, the organic solvent may include a mixed solvent which includes at least two of ethylene carbonate (EC), dimethyl carbonate (DMC), diethyl carbonate (DEC), propylene carbonate, and ethylmethyl carbonate.

Also, in the non-aqueous electrolyte solution for a lithium secondary battery, the weight ratio of the lithium difluorophosphate:the tertiary alkylbenzene represented by Formula 1:the tetra-vinyl silane, as the additive, may be in a range of 1:1.5 to 4:0.1 to 0.2.

In this case, in the non-aqueous electrolyte solution for a lithium secondary battery, a concentration of the lithium difluorophosphate in the non-aqueous electrolyte solution for a lithium secondary battery may be in a range of $1\times10^{-2}$ mol/kg to 0.5 mol/kg.

In the non-aqueous electrolyte solution for a lithium secondary battery, the additive may be included in an amount of 2.5 wt % to 4.3 wt % based on the total weight of the non-aqueous electrolyte solution for a lithium secondary battery.

Also, in the non-aqueous electrolyte solution for a lithium secondary battery, the non-aqueous electrolyte solution for a lithium secondary battery may further include at least one additive for forming a solid electrolyte interface (SEI) film which is selected from the group consisting of vinylene carbonate (VC), vinyl ethylene carbonate, fluoroethylene carbonate, ethylene sulfate (Esa), and propane sultone (PS).

The additive for forming an SEI may be included in an amount of at least 0.1 wt % to 2 wt % based on the total weight of the non-aqueous electrolyte solution.

According to another aspect of the present invention, there is provided a lithium secondary battery which includes a negative electrode including a negative electrode active material, a positive electrode including a positive electrode active material, and a non-aqueous electrolyte solution, wherein the positive electrode active material includes at least one of a compound represented by Formula 4 and a compound represented by Formula 5, and the non-aqueous electrolyte solution includes the non-aqueous electrolyte solution for a lithium secondary battery of the present invention:

$Li(Ni_xCo_yMn_z)O_2$        [Formula 4]

wherein, in Formula 4,
$0<x<1$, $0<y<1$, $0<z<1$, and $x+y+z=1$, and

$Li(Ni_{x1}Co_{y1}Mn_{z1})O_4$        [Formula 5]

wherein, in Formula 5,
$0<x1<2$, $0<y1<2$, $0<z1<2$, and $x1+y1+z1=2$.

In the lithium secondary battery, the positive electrode active material may include one selected from the group consisting of $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$.

Also, the positive electrode active material may further includes a compound represented by Formula 6:

$LiMnO_2$        [Formula 6]

In this case, the positive electrode active material may include the compound represented by Formula 4 or 5 in an amount of 80 wt % to 99 wt % and the compound represented by Formula 6 in an amount of 1 wt % to 20 wt %.

Advantageous Effects

According to an embodiment of the present invention, a non-aqueous electrolyte solution for a lithium secondary battery, which may form a stable solid electrolyte interface (SEI) film on a surface of a negative electrode, may be prepared by including a mixed additive which is mixed in a specific ratio. Also, a lithium secondary battery, in which high-temperature storage characteristics and life characteristics are improved by not only reducing interfacial resistance with the electrode by the stable SEI film formed on the surface of the negative electrode, but also suppressing a side reaction of a positive electrode active material at a high voltage, may be prepared by including the non-aqueous electrolyte solution.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
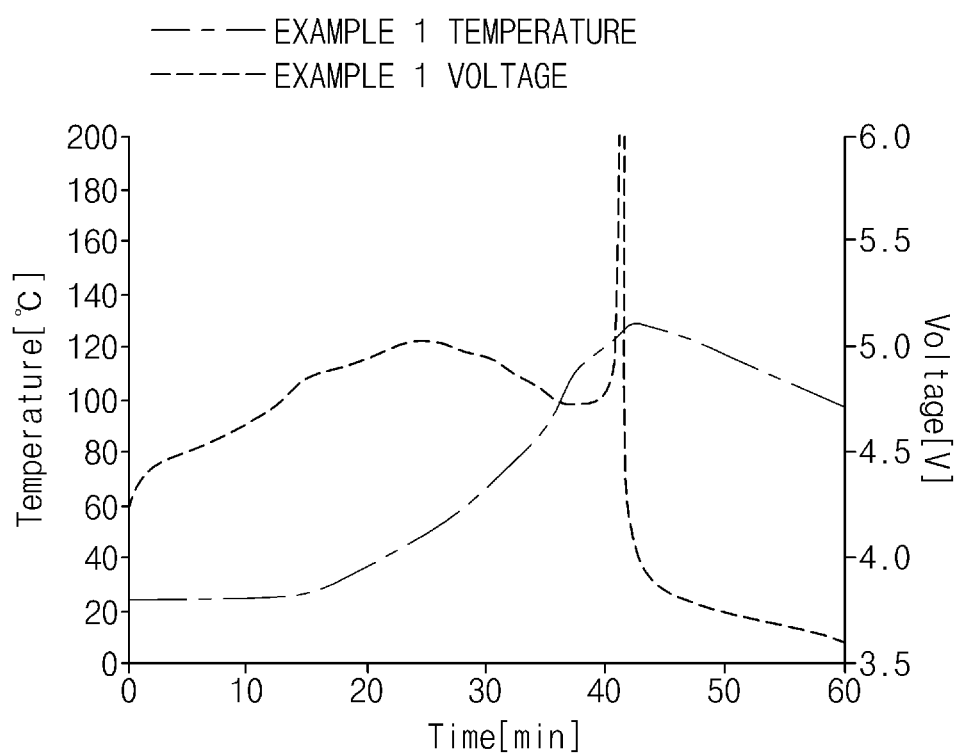
FIG. 1 is a graph illustrating the measurement results of stability during overcharge of a secondary battery of Example 1 according to Experimental Example 3 of the present invention.

Hereinafter, the present invention will be described in more detail.

It will be understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

Specifically, in an embodiment of the present invention, provided is a non-aqueous electrolyte solution for a lithium secondary battery including:
an ionizable lithium salt,
an organic solvent, and
an additive,
wherein the additive is a mixed additive which includes lithium difluorophosphate (LiDFP), tertiary alkylbenzene represented by Formula 1, and tetra-vinyl silane (TVS) in a weight ratio of 1:1 to 4:0.05 to 0.5, and
the additive is included in an amount of 2.5 wt % to 4.5 wt % based on a total weight of the non-aqueous electrolyte solution for a lithium secondary battery.

[Formula 1]

In Formula 1,
$R_1$ is a tertiary alkyl having 4 to 5 carbon atoms.

First, in the non-aqueous electrolyte solution for a lithium secondary battery according to the embodiment of the present invention, any electrolyte salt typically used in an electrolyte solution for a lithium secondary battery may be used as the ionizable lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include a single material selected from the group consisting of LiCl, LiBr, LiI, LiClO$_4$, LiBF$_4$, LiB$_{10}$Cl$_{10}$, LiPF$_6$, LiCF$_3$SO$_3$, LiCH$_3$CO$_2$, LiCF$_3$CO$_2$, LiAsF$_6$, LiSbF$_6$, LiAlCl$_4$, LiAlO$_4$, and LiCH$_3$SO$_3$, or a mixture of two or more thereof, and, in addition thereto, an electrolyte salt, such as a lithium imide salt represented by lithium bisperfluoroethanesulfonimide (LiBETI, LiN(SO$_2$C$_2$F$_5$)$_2$), lithium fluorosulfonyl imide (LiFSI, LiN(SO$_2$F)$_2$), and lithium (bis)trifluoromethanesulfonimide (LiTFSI, LiN(SO$_2$CF$_3$)$_2$) which are typically used in the electrolyte solution of the lithium secondary battery, may be used without limitation. Specifically, the electrolyte salt may include a single material selected from the group consisting of LiPF$_6$, LiBF$_4$, LiCH$_3$CO$_2$, LiCF$_3$CO$_2$, LiCH$_3$SO$_3$, LiFSI, LiTFSI, and LiN(C$_2$F$_5$SO$_2$)$_2$, or a mixture of two or more thereof. However, the lithium salt does not include LiDFP, a lithium salt included in the mixed additive.

The lithium salt may be appropriately changed in a normally usable range, but may specifically be included in a concentration of 0.1 M to 2 M in the non-aqueous electrolyte solution for a lithium secondary battery.

In a case in which the concentration of the lithium salt is 0.1 M or less, effects of improving low-temperature output and high-temperature cycle characteristics of the battery may be insignificant, and, in a case in which the concentration of the lithium salt is greater than 2 M, since a side reaction in the electrolyte solution may excessively occur during charge and discharge of the battery, a swelling phenomenon may occur and corrosion of a positive electrode collector or negative electrode collector formed of metal may occur in the electrolyte solution.

Also, in the non-aqueous electrolyte solution for a lithium secondary battery according to the embodiment of the present invention, the organic solvent is a solvent which may minimize decomposition due to an oxidation reaction during charge and discharge of the secondary battery and may exhibit desired characteristics with the additive, wherein an ester-based solvent may be used.

Specific examples of the ester-based solvent may be at least one compound selected from the group consisting of a cyclic carbonate compound, a linear carbonate compound, a linear ester compound, and a cyclic ester compound.

Among these compounds, the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof, and may specifically include any one selected from the group consisting of ethylene carbonate, propylene carbonate, vinylene carbonate, and fluoroethylene carbonate (FEC), or a mixture of two or more thereof.

Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, and the linear carbonate compound may specifically include any one selected from the group consisting of dimethyl carbonate, diethyl carbonate, dipropyl carbonate, and ethylmethyl carbonate, or a mixture of two or more thereof.

Specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, σ-valerolactone, and ε-caprolactone, or a mixture of two or more thereof, but the present invention is not limited thereto.

Among the ester-based solvents, since the cyclic carbonate-based compound is well dissociate the lithium salt in the electrolyte due to high permittivity as a highly viscous organic solvent, the cyclic carbonate-based compound may be preferably used. Since an electrolyte solution having high electrical conductivity may be prepared when the above cyclic carbonate-based compound is mixed with the low viscosity, low permittivity linear carbonate-based compound, such as dimethyl carbonate and diethyl carbonate, and the linear ester-based compound in an appropriate ratio, the cyclic carbonate-based compound may be more preferably used.

Specifically, the cyclic carbonate-based compound and the linear carbonate-based compound may be mixed and used as the organic solvent, and, as a representative example, the organic solvent may include a mixed solvent which includes at least two of ethylene carbonate (EC), dimethyl carbonate (DMC), diethyl carbonate (DEC), propylene carbonate, and ethylmethyl carbonate.

Also, an ether-based solvent or an amide-based solvent may be further used as the organic solvent.

As the ether-based solvent among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Also, in the non-aqueous electrolyte solution for a lithium secondary battery according to the embodiment of the present invention, lithium difluorophosphate represented by the following Formula 2, as one of the additive components, is a component for achieving an effect of improving long-term life characteristics of the secondary battery, wherein the lithium difluorophosphate may not only allow a lithium ion component formed by decomposition during initial charge to form a stable solid electrolyte interface (SEI) film on the surface of the negative electrode and improve lithium (Li) mobility to the negative electrode by the formation of the SEI, but may also reduce interfacial resistance. Furthermore, difluorophosphate anions, which are formed by decomposition during the initial charge, may improve positive electrode stabilization and discharge characteristics while being presented on the surface of the positive electrode.

[Formula 2]

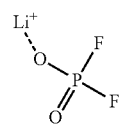

Furthermore, in the non-aqueous electrolyte solution for a lithium secondary battery of the present invention, the tertiary alkylbenzene represented by Formula 1 and included as one of the additive components is a component that may suppress a side reaction of a positive electrode active material at a high voltage, wherein representative examples of the tertiary alkylbenzene may be tertiary butylbenzene (TBB) or tertiary pentylbenzene (TPB), and the tertiary alkylbenzene may preferably include tertiary butylbenzene.

The tertiary alkylbenzene represented by Formula 1 forms a film while being oxidized at a potential near 4.8 V to 5.0 V during overcharge, and, since the oxidized oxide is deposited on the negative electrode and a separator facing the negative electrode, an increase in voltage due to overcurrent may be suppressed by suppressing the movement of Li ions and reactivity between Li deposited on the negative electrode and the electrolyte solution. Thus, high-temperature, high-voltage, and overcharge stability may be improved.

Also, in the non-aqueous electrolyte solution for a lithium secondary battery of the present invention, the tetra-vinyl silane represented by the following Formula 3 and included as one of the additive components is a component that may suppress a reaction between the lithium ions and the electrolyte solution, wherein, since a silicon (Si) element contained may form a solid ion conductive film through physical adsorption and electrochemical reaction on the surfaces of the positive electrode and negative electrode, stability during high-temperature storage may be improved by suppressing the side reaction of the positive electrode active material at a high voltage.

[Formula 3]

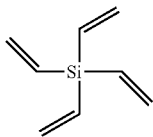

Furthermore, in the non-aqueous electrolyte solution for a lithium secondary battery according to the embodiment of the present invention, the weight ratio of the lithium difluorophosphate:the tertiary alkylbenzene represented by Formula 1:the tetra-vinyl silane may be in a range of 1:1 to 4:0.05 to 0.5, for example, 1:1.5 to 4:0.1 to 0.2.

In a case in which each component of the additive is mixed in the above ratio in the non-aqueous electrolyte solution of the present invention, since a stable film, which has an effect of suppressing the side reaction with the electrolyte solution on the surfaces of the negative electrode and positive electrode or reducing gas generation during charge and discharge of the lithium secondary battery, may be formed, a secondary battery having more improved overall performance may be prepared.

In a case in which a content ratio of the tertiary alkylbenzene is less than 1, an effect of improving the overcharge stability of the battery is insignificant, and, in a case in which the content ratio of the tertiary alkylbenzene is greater than 4, an increase in resistance may occur during discharge due to a decrease in ionic conductivity accompanied by an increase in viscosity in the electrolyte solution.

Also, in a case in which a content ratio of the tetra-vinyl silane is less than 0.05, high-temperature durability may be reduced, and, in a case in which the content ratio of the tetra-vinyl silane is greater than 0.5, the resistance may be increased.

In the non-aqueous electrolyte solution for a lithium secondary battery, a concentration of the lithium difluorophosphate in the non-aqueous electrolyte solution for a lithium secondary battery may be in a range of $1 \times 10^{-2}$ mol/kg to 0.5 mol/kg.

Furthermore, the non-aqueous electrolyte solution additive may be included in an amount of 2.5 wt % to 4.5 wt %, for example, 2.5 wt % to 4.3 wt %, based on the total weight of the non-aqueous electrolyte solution.

In the present invention, since the additive is included in the above-described amount in the non-aqueous electrolyte solution, reduction of the interfacial resistance and suppression of the side reaction may be effectively achieved. In a case in which the amount of the additive is less than 2.5 wt %, an effect of improving physical properties of the secondary battery may be insignificant, and, in a case in which the amount of the additive is greater than 4.5 wt %, since the additive is excessively included, changes in battery thickness may be suppressed due to the suppression of the gas generation, but the resistance in the electrolyte solution may be increased to reduce capacity and life characteristics.

Also, in order to increase gas reduction effect and high-temperature durability improvement effect, the non-aqueous electrolyte solution for a lithium secondary battery of the present invention may further include at least one additive for forming an SEI film which is selected from the group consisting of vinylene carbonate (VC), vinyl ethylene carbonate, fluoroethylene carbonate, ethylene sulfate (Esa), and propane sultone (PS).

The additive for forming an SEI film may be included in an amount of 0.1 wt % or more, for example, at least 0.1 wt % to 2 wt %, based on the total weight of the non-aqueous electrolyte solution. In a case in which the amount of the additive for forming an SEI is greater than 2 wt %, since the additive is excessively used in the non-aqueous electrolyte solution, an increase in resistance and an accompanying decrease in capacity may occur.

In addition, if necessary, in order to improve charge/discharge characteristics and flame retardancy, the non-aqueous electrolyte solution of the present invention may further include a conventionally known electrolyte solution additive, specifically, at least one additional additive selected from the group consisting of pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride. In some cases, halogen-containing solvents, such as carbon tetrachloride and ethylene trifluoride, may be further included in order to impart incombustibility, carbon dioxide gas may be further included in order to improve high-temperature storage characteristics, and fluoro-ethylene carbonate (FEC) or 1,3-propene sultone (PRS) may be further included.

Also, in an embodiment of the present invention, provided is a lithium secondary battery which includes a negative electrode including a negative electrode active material, a positive electrode including a positive electrode active material, and a non-aqueous electrolyte solution, wherein the positive electrode active material includes at least one of a compound represented by the following Formula 4 and a compound represented by following Formula 5, and the non-aqueous electrolyte solution includes the non-aqueous electrolyte solution for a lithium secondary battery of the present invention.

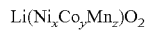 [Formula 4]

In Formula 4,
0<x<1, 0<y<1, 0<z<1, and x+y+z=1.

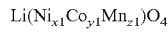 [Formula 5]

In Formula 5,
0<x1<2, 0<y1<2, 0<z1<2, and x1+y1+z1=2.

In this case, the positive electrode and the negative electrode constituting the lithium secondary battery of the present invention may be prepared by a conventional method and used.

First, the positive electrode may be prepared by forming a positive electrode material mixture layer on a positive electrode collector. The positive electrode material mixture layer may be prepared by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

Also, since the positive electrode active material represented by Formula 4 or 5 has a superlattice structure while three components have different valences from one another, the positive electrode active material represented by Formula 4 or 5 is significantly more structurally stable than a positive electrode active material such as $LiCoO_2$. Representative examples of the positive electrode active material may be $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$.

In addition, the positive electrode active material may further include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), if necessary.

As the positive electrode active material, a lithium composite metal oxide may include $LiCoO_2$, $LiMnO_2$, $LiNiO_2$, or lithium nickel cobalt aluminum oxide (e.g., $Li(Ni_{0.8}Co_{0.15}Al_{0.05})O_2$, etc.).

The positive electrode active material may be included in an amount of 90 wt % to 99 wt %, for example, 90 wt % to 95 wt %, based on a total weight of solid content in the positive electrode slurry.

In a case in which the amount of the positive electrode active material is 90 wt % or less, since energy density is decreased, capacity may be reduced.

The binder is a component that assists in the binding between the positive electrode active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Any conductive agent may be used as the conductive agent without particular limitation so long as it has conductivity without causing adverse chemical changes in the battery, and, for example, a conductive material such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The conductive agent is commonly added in an amount of 1 wt % to 30 wt % based on the total weight of the solid content in the positive electrode slurry.

Those sold under the names, such as acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon), may be used as the conductive agent.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

Also, the negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x < 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the slurry including the negative electrode active material as well as selectively the binder and the conductive agent is in a range of 50 wt % to 75 wt %, for example, 50 wt % to 65 wt %.

Also, the lithium secondary battery of the present invention may further include a separator.

A typical porous polymer film used in a general lithium secondary battery, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

A non-aqueous electrolyte solution was prepared by mixing 2.7 g of an additive (weight ratio of lithium difluorophosphate:tertiary butylbenzene:tetra-vinyl silane=1:1.5:0.2) with 97.3 g of a non-aqueous organic solvent composed of ethylene carbonate (EC) and ethyl methyl carbonate (EMC) (30:70 vol %) in which 1.0 M $LiPF_6$ was dissolved (see Table 1 below).

(Secondary Battery Preparation)

$Li(Ni_{0.6}Mn_{0.2}Co_{0.2})O_2$ as a positive electrode active material, carbon black as a conductive agent, and polyvinylidene fluoride, as a binder, were added to N-methyl-2-pyrrolidone (NMP), as a solvent, at a weight ratio of 96:2:2 to prepare a positive electrode active material slurry (solid concentration of 50 wt %). An about 20 μm thick aluminum (Al) thin film, as a positive electrode collector, was coated with the positive electrode active material slurry and dried, and the coated Al thin film was then roll-pressed to prepare a positive electrode.

Also, carbon powder (graphite) as a negative electrode active material, polyvinylidene fluoride as a binder, and carbon black, as a conductive agent, were added to NMP, as a solvent, at a weight ratio of 96:3:1 to prepare a negative electrode active material slurry (solid concentration of 60 wt %). A 10 μm thick copper (Cu) thin film, as a negative electrode collector, was coated with the negative electrode active material slurry and dried, and the coated Cu thin film was then roll-pressed to prepare a negative electrode.

Next, after an electrode assembly was prepared by a typical method by stacking a polyethylene porous film with the positive electrode and negative electrode thus prepared, the electrode assembly was put in a battery case, the non-aqueous electrolyte solution was injected thereinto, and the battery case was then sealed to prepare a lithium secondary battery.

Example 2

A non-aqueous electrolyte solution and a secondary battery including the same were prepared in the same manner as in Example 1 except that 2.6 g of an additive (weight ratio of lithium difluorophosphate:tertiary butylbenzene:tetra-vinyl silane=1:1.5:0.1) was included in 97.4 g of a non-aqueous organic solvent during the preparation of the non-aqueous electrolyte solution in Example 1 (see Table 1 below).

Example 3

A non-aqueous electrolyte solution and a secondary battery including the same were prepared in the same manner as in Example 1 except that 4.5 g of an additive (weight ratio of lithium difluorophosphate:tertiary butylbenzene:tetra-vinyl silane=1:4:0.5) was included in 95.5 g of a non-aqueous organic solvent during the preparation of the non-aqueous electrolyte solution in Example 1 (see Table 1 below).

Example 4

A non-aqueous electrolyte solution and a secondary battery including the same were prepared in the same manner as in Example 1 except that 2.5 g of an additive (weight ratio of lithium difluorophosphate:tertiary butylbenzene:tetra-vinyl silane=1:1:0.05) was included in 97.5 g of a non-aqueous organic solvent during the preparation of the non-aqueous electrolyte solution in Example 1 (see Table 1 below).

Example 5

A non-aqueous electrolyte solution and a secondary battery including the same were prepared in the same manner as in Example 1 except that 2.7 g of an additive (weight ratio of lithium difluorophosphate:tertiary butylbenzene:tetra-vinyl silane=1:1.5:0.1) was included in 96.8 g of a non-aqueous organic solvent and 0.5 g of propane sultone (PS) was further included during the preparation of the non-aqueous electrolyte solution in Example 1 (see Table 1 below).

Example 6

A non-aqueous electrolyte solution and a secondary battery including the same were prepared in the same manner as in Example 5 except that 2.7 g of an additive, 0.5 g of propane sultone (PS), as an additive for forming an SEI film, and 1 g of ethylene sulfate (Esa) were included in 95.8 g of a non-aqueous organic solvent during the preparation of the non-aqueous electrolyte solution in Example 5 (see Table 1 below).

Example 7

A non-aqueous electrolyte solution and a secondary battery including the same were prepared in the same manner as in Example 1 except that 2.7 g of an additive (weight ratio of lithium difluorophosphate:tertiary butylbenzene:tetra-vinyl silane=1:1.5:0.1), 0.5 g of vinylene carbonate, as an additive for forming an SEI, 0.5 g of propane sultone (PS), and 1 g of ethylene sulfate (Esa) were included in 95.3 g of a non-aqueous organic solvent during the preparation of the non-aqueous electrolyte solution in Example 1 (see Table 1 below).

Comparative Example 1

A non-aqueous electrolyte solution and a secondary battery including the same were prepared in the same manner as in Example 1 except that 2.5 g of an additive (weight ratio of lithium difluorophosphate:tertiary butylbenzene=1:1.5) was included in 97.5 g of a non-aqueous organic solvent during the preparation of the non-aqueous electrolyte solution in Example 1 (see Table 1 below).

Comparative Example 2

A non-aqueous electrolyte solution and a secondary battery including the same were prepared in the same manner as in Example 1 except that 2.5 g of an additive (weight ratio of tertiary butylbenzene:tetra-vinyl silane=1.5:0.1) was included in 97.5 g of a non-aqueous organic solvent during the preparation of the non-aqueous electrolyte solution in Example 1 (see Table 1 below).

Comparative Example 3

A non-aqueous electrolyte solution and a secondary battery including the same were prepared in the same manner as in Example 1 except that 2.05 g of an additive (weight ratio of lithium difluorophosphate:tertiary butylbenzene:

tetra-vinyl silane=1:1:0.05) was included in 97.95 g of a non-aqueous organic solvent during the preparation of the non-aqueous electrolyte solution in Example 1 (see Table 1 below).

Comparative Example 4

A non-aqueous electrolyte solution and a secondary battery including the same were prepared in the same manner as in Example 1 except that 5.5 g of an additive (weight ratio of lithium difluorophosphate:tertiary butylbenzene:tetra-vinyl silane=1:4:0.5) was included in 94.5 g of a non-aqueous organic solvent during the preparation of the non-aqueous electrolyte solution in Example 1 (see Table 1 below).

Comparative Example 5

A non-aqueous electrolyte solution and a secondary battery including the same were prepared in the same manner as in Example 1 except that 0.5 g of an additive (weight ratio of lithium difluorophosphate:tertiary butylbenzene:tetra-vinyl silane=1:1.5:0.1) was included in 99.5 g of a non-aqueous organic solvent during the preparation of the non-aqueous electrolyte solution in Example 1 (see Table 1 below).

Comparative Example 6

A non-aqueous electrolyte solution and a secondary battery including the same were prepared in the same manner as in Example 1 except that 5.0 g of an additive (weight ratio of lithium difluorophosphate:tertiary butylbenzene:tetra-vinyl silane=1:1.5:0.1) was included in 95 g of a non-aqueous organic solvent during the preparation of the non-aqueous electrolyte solution in Example 1 (see Table 1 below).

Comparative Example 7

A non-aqueous electrolyte solution and a secondary battery including the same were prepared in the same manner as in Example 1 except that 2.7 g of an additive (weight ratio of lithium difluorophosphate:tertiary butylbenzene:tetra-vinyl silane=1:0.8:0.6) was included in 97.3 g of a non-aqueous organic solvent during the preparation of the non-aqueous electrolyte solution in Example 1 (see Table 1 below).

Comparative Example 8

A non-aqueous electrolyte solution and a secondary battery including the same were prepared in the same manner as in Example 1 except that 2.7 g of an additive (weight ratio of lithium difluorophosphate:tertiary butylbenzene:tetra-vinyl silane=1:4.3:0.04) was included in 97.3 g of a non-aqueous organic solvent during the preparation of the non-aqueous electrolyte solution in Example 1 (see Table 1 below).

Comparative Example 9

A non-aqueous electrolyte solution and a secondary battery including the same were prepared in the same manner as in Example 1 except that 2.6 g of an additive (weight ratio of lithium difluorophosphate:tertiary butylbenzene:tetra-vinyl silane=1:1.5:0.1) was included in 97.4 g of a non-aqueous organic solvent during the preparation of the non-aqueous electrolyte solution in Example 1, and $LiCoO_2$ was included as a positive electrode active material during the preparation of the secondary battery (see Table 1 below).

Comparative Example 10

A non-aqueous electrolyte solution and a secondary battery including the same were prepared in the same manner as in Example 1 except that 2.5 g of an additive (weight ratio of lithium difluorophosphate:tetra-vinyl silane=1:0.1) was included in 97.5 g of a non-aqueous organic solvent during the preparation of the non-aqueous electrolyte solution in Example 1 (see Table 1 below).

EXPERIMENTAL EXAMPLES

Experimental Example 1: Comparison of High-Temperature Storage Characteristics

Initial capacities of the secondary batteries prepared in Examples 1 to 7 and Comparative Examples 1 to 9 were measured. Subsequently, after the secondary batteries were stored at 60° C. for 12 weeks, each secondary battery was charged at 1 C to 4.25 V/38 mA under a constant current/constant voltage (CC/CV) condition at room temperature and then discharged at a constant current (CC) of 1 C to a voltage of 3.0 V to measure capacity after 12 weeks. Capacity retention was calculated using the following Equation 1, and the results thereof are presented in Table 1 below.

Also, initial resistances of the secondary batteries prepared in Examples 1 to 7 and Comparative Examples 1 to 9 were measured. Subsequently, after the secondary batteries were stored at 60° C. for 12 weeks, each secondary battery was discharged at 5 C for 10 seconds at a state of charge (SOC) of 50% at room temperature, and resistance after 12 weeks was then measured by a voltage difference generated. A resistance increase rate was calculated using the following Equation 2, and the results thereof are presented in Table 1 below.

Furthermore, initial thicknesses of the secondary batteries prepared in Examples 1 to 7 and Comparative Examples 1 to 9 were measured, a change in thickness of each battery was measured after the secondary batteries were stored at 60° C. for 12 weeks, and a battery thickness change rate was then calculated using the following Equation 3.

Capacity retention=(capacity after 12 weeks/initial capacity)×100     [Equation 1]

Resistance increase rate=((resistance after 12 weeks/initial resistance)×100)−100     [Equation 2]

Battery thickness change rate=((battery thickness after 12 weeks/battery thickness at 0 week)×100)−100     [Equation 3]

Experimental Example 2: Comparison of High-Temperature Life Characteristics

The secondary batteries prepared in Examples 1 to 7 and Comparative Examples 1 to 9 were charged at 1 C to 4.25 V/38 mA under a constant current/constant voltage (CC/CV) condition at 45° C. and then discharged at a constant current (CC) of 1 C to a voltage of 3.0 V. After the charge and discharge was repeated 800 cycles, capacity of each secondary battery was measured. Subsequently, high-temperature life characteristics were calculated using the following Equation 4, and the results thereof are presented in Table 1 below.

Also, after the secondary batteries prepared in Examples 1 to 7 and Comparative Examples 1 to 9 were subjected to 800 cycles at 45° C., resistance was measured by a voltage difference generated by discharging each secondary battery at 5 C for 10 seconds at a SOC of 50% at room temperature. Subsequently, a resistance change rate was calculated using the following Equation 5, and the results thereof are presented in Table 1 below.

Capacity retention=(800 cycles/1 cycle)×100  [Equation 4]

Resistance increase rate=((800 cycle resistance/initial cycle resistance)×100)−100  [Equation 5]

TABLE 1

| | Additive (LiDFP:TAB:TVS) ratio | Amount (g) | Additive for forming an SEI film Type | Amount (g) | Positive electrode material | High-temperature storage characteristics (%) Capacity | Resistance increase | Battery thickness | High-temperature life characteristics (%) after 800 cycles Capacity | Resistance increase |
|---|---|---|---|---|---|---|---|---|---|---|
| Example 1 | 1:1.5:0.2 | 2.7 | | | $Li(Ni_{0.6}Mn_{0.2}Co_{0.2})O_2$ | 88.7 | 19.3 | 23.5 | 82.2 | 40.1 |
| Example 2 | 1:1.5:0.1 | 2.6 | | | | 87.4 | 16.3 | 27.3 | 83.8 | 43.5 |
| Example 3 | 1:4:0.5 | 4.5 | | | | 86.4 | 21.5 | 22.7 | 82.4 | 42.2 |
| Example 4 | 1:1:0.05 | 2.5 | | | | 89.3 | 18.1 | 28.5 | 83.1 | 43.7 |
| Example 5 | 1:1.5:0.1 | 2.7 | PS | 0.5 | | 90.3 | 15.5 | 27.4 | 83.5 | 38.0 |
| Example 6 | 1:1.5:0.1 | 2.7 | PS Esa | 0.5 1 | | 91.7 | 13.1 | 20.2 | 84.4 | 35.1 |
| Example 7 | 1:1.5:0.1 | 2.7 | VC PS Esa | 0.5 0.5 1 | | 86.3 | 21.2 | 46.4 | 83.8 | 32.1 |
| Comparative Example 1 | 1:1.5:0 | 2.5 | | | $Li(Ni_{0.6}Mn_{0.2}Co_{0.2})O_2$ | 88.3 | 28.1 | 48.3 | 81.1 | 58.2 |
| Comparative Example 2 | 0:1.5:0.1 | 2.5 | | | | 82.4 | 26.5 | 28.9 | 78.2 | 52.3 |
| Comparative Example 3 | 1:1:0.05 | 2.05 | | | | 85.6 | 23.8 | 38.5 | 80.5 | 48.8 |
| Comparative Example 4 | 1:4:0.5 | 5.5 | | | | 83.3 | 24.7 | 20.5 | 81.3 | 45.3 |
| Comparative Example 5 | 1:1.5:0.1 | 0.5 | | | | 80.4 | 32.3 | 42.2 | 76.3 | 52.2 |
| Comparative Example 6 | 1:1.5:0.1 | 5.0 | | | | 83.1 | 27.2 | 21.1 | 79.1 | 44.3 |
| Comparative Example 7 | 1:0.8:0.6 | 2.7 | | | | 81.1 | 31.7 | 22.2 | 79.8 | 49.2 |
| Comparative Example 8 | 1:4.3:0.04 | 2.7 | | | | 83.2 | 29.7 | 47.1 | 78.3 | 55.3 |
| Comparative Example 9 | 1:1.5:0.1 | 2.6 | | | $LiCoO_2$ | 80.1 | 20.7 | 53.1 | 74.1 | 53.2 |

As illustrated in Table 1, with respect to the secondary batteries of Examples 1 to 7, it may be understood that capacity after high-temperature storage was maintained at 86% or more, an increase in resistance was suppressed to less than 21.5%, and a battery thickness increase rate was excellent at about 28.5% or less. Also, it may be understood that capacity after 800 cycles at high temperature was maintained at 82% or more, and the increase in resistance was suppressed to less than 44%.

However, with respect to the secondary battery of Example 7, since it included a small amount of VC having a relatively low oxidation potential in the non-aqueous electrolyte solution, $CO_2$ was generated at the positive electrode during the high-temperature storage, and thus, it may be understood that a battery thickness was increased in comparison to the secondary batteries of Examples 1 to 6.

In contrast, with respect to the secondary battery of Comparative Example 2 which did not include lithium difluorophosphate among the additive components, the secondary battery of Comparative Example 1 which did not include tetra-vinyl silane, the secondary batteries of Comparative Examples 3 and 5 in which the amount of the additive was less than 2.5 wt %, and the secondary batteries of Comparative Examples 4 and 6 in which the amount of the additive was greater than 4.5 wt %, it may be understood that the capacity retention after 800 cycles at high temperature and resistance increase rate as well as the resistance increase rate after high-temperature storage and battery thickness increase rate were mostly degraded in comparison to the lithium secondary batteries of Examples 1 to 7 including the non-aqueous electrolyte solution of the present invention.

In particular, with respect to the secondary battery of Comparative Example 7, in which, among the additive components, a small amount of the tertiary alkylbenzene among the additive components was included and an excessive amount of the tetra-vinyl silane was included, and the secondary battery of Comparative Example 8 in which an excessive amount of the tertiary alkylbenzene was included and a small amount of the tetra-vinyl silane was included, it may be understood that the capacity retention after 800 cycles at high temperature and resistance increase rate as well as the resistance increase rate after high-temperature storage and battery thickness increase rate were significantly degraded in comparison to the lithium secondary batteries of Examples 1 to 7 including the non-aqueous electrolyte solution of the present invention.

Also, with respect to the secondary battery of Comparative Example 9 in which LCO was used as a positive electrode active material instead of the ternary positive electrode active material, it may be understood that the capacity retention after 800 cycles at high temperature and resistance increase rate as well as the resistance increase rate after high-temperature storage and battery thickness increase rate were degraded in comparison to the secondary batteries of Examples 1 to 7.

Experimental Example 3

Figure 2:
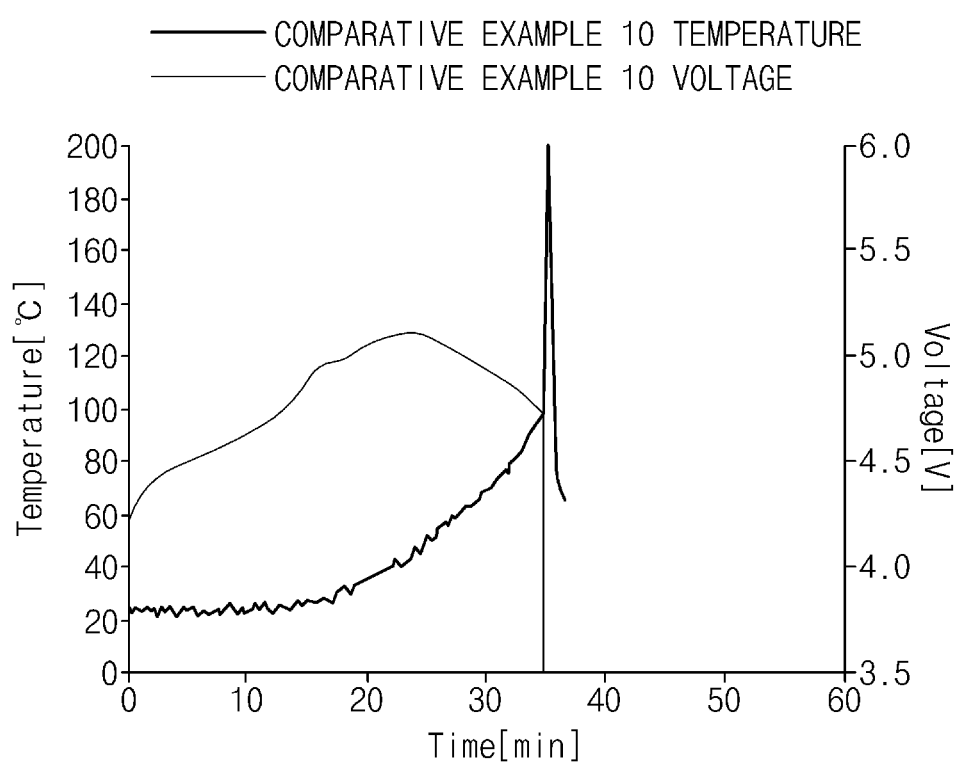
FIG. 2 is a graph illustrating the measurement results of stability during overcharge of a secondary battery of Comparative Example 10 according to Experimental Example 3 of the present invention.

The secondary battery prepared in Example 1 and Comparative Example 10 were respectively overcharged at a constant current/constant voltage (CC/CV) of 1 C (775 mAh)/12 V to a voltage of 8.5 V from a charged state at 25° C., changes in temperature and voltage of each battery in this case were measured, and the results thereof are presented in FIGS. 1 and 2.

Referring to FIG. 1, with respect to the secondary battery of Example 1, the overcharge of the cell was suppressed by delaying an increase in voltage by overcurrent while consuming electrons near 4.85 V during the overcharge (see line "---" in FIG. 1). Thus, a rapid increase in the temperature of the secondary battery during the overcharge may be prevented (see line "—-—" in FIG. 1). That is, it may be understood that the temperature of the secondary battery of Example 1 was gradually increased to 130° C. and then decreased.

In contrast, with respect to the secondary battery of Comparative Example 10, since the battery was overheated while a rapid change in temperature up to 200° C. occurred near 4.8 V (about 35 minutes) (see line "—" in FIG. 2), a fire or explosion phenomenon occurred. Thus, with respect to the secondary battery of Comparative Example 10, it may be understood that it was not possible to measure a voltage greater than about 4.8 V (after about 35 minutes) (see line "—" in FIG. 2).

From these results, it may be understood that the stability of the secondary battery was reduced when tertiary alkylbenzene, as one of the additive components, was not included in the non-aqueous electrolyte solution of the present invention.

The invention claimed is:

1. A non-aqueous electrolyte solution for a lithium secondary battery, the non-aqueous electrolyte solution comprising:
   an ionizable lithium salt,
   an organic solvent, and
   an additive,
   wherein the additive is a mixed additive which includes lithium difluorophosphate, tertiary alkylbenzene represented by Formula 1, and tetra-vinyl silane in a weight ratio of 1:1 to 4:0.05 to 0.5, and
   the additive is included in an amount of 2.5 wt % to 4.5 wt % based on a total weight of the non-aqueous electrolyte solution for a lithium secondary battery:

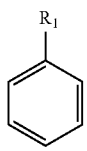
[Formula 1]

wherein, in Formula 1,
   $R_1$ is a tertiary alkyl having 4 to 5 carbon atoms.

2. The non-aqueous electrolyte solution for a lithium secondary battery of claim 1, wherein the organic solvent is a mixed solvent which includes at least two of ethylene carbonate, dimethyl carbonate, diethyl carbonate, propylene carbonate, and ethylmethyl carbonate.

3. The non-aqueous electrolyte solution for a lithium secondary battery of claim 1, wherein the weight ratio of the lithium difluorophosphate:the tertiary alkylbenzene represented by Formula 1:the tetra-vinyl silane is in a range of 1:1.5 to 4:0.1 to 0.2.

4. The non-aqueous electrolyte solution for a lithium secondary battery of claim 1, wherein a concentration of the lithium difluorophosphate in the non-aqueous electrolyte solution for a lithium secondary battery is in a range of $1 \times 10^{-2}$ mol/kg to 0.5 mol/kg.

5. The non-aqueous electrolyte solution for a lithium secondary battery of claim 1, wherein the additive is included in an amount of 2.5 wt % to 4.3 wt % based on the total weight of the non-aqueous electrolyte solution for a lithium secondary battery.

6. The non-aqueous electrolyte solution for a lithium secondary battery of claim 1, further comprising at least one additive for forming a solid electrolyte interface (SEI) film which is selected from the group consisting of vinylene carbonate (VC), vinyl ethylene carbonate, fluoroethylene carbonate, ethylene sulfate (Esa), and propane sultone (PS).

7. The non-aqueous electrolyte solution for a lithium secondary battery of claim 6, wherein the additive for forming an SEI is included in an amount of at least 0.1 wt % to 2 wt % based on a total weight of the non-aqueous electrolyte solution.

8. A lithium secondary battery which comprises a negative electrode including a negative electrode active material, a positive electrode including a positive electrode active material, and a non-aqueous electrolyte solution,
   wherein the positive electrode active material comprises at least one of a compound represented by Formula 4 and a compound represented by Formula 5, and
   the non-aqueous electrolyte solution comprises the non-aqueous electrolyte solution for a lithium secondary battery of claim 1:

$$Li(Ni_xCo_yMn_z)O_2 \qquad [\text{Formula 4}]$$

wherein, in Formula 4,
   $0<x<1$, $0<y<1$, $0<z<1$, and $x+y+z=1$, and $$Li(Ni_{x1}Co_{y1}Mn_{z1})O_4 \qquad [\text{Formula 5}]$$

wherein, in Formula 5,
   $0<x1<2$, $0<y1<2$, $0<z1<2$, and $x1+y1+z1=2$.

9. The lithium secondary battery of claim 8, wherein the positive electrode active material is selected from the group consisting of $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$.

10. The lithium secondary battery of claim 8, wherein the positive electrode active material further comprises a compound represented by Formula 6:

$$LiMnO_2. \qquad [\text{Formula 6}]$$

11. The lithium secondary battery of claim 10, wherein the positive electrode active material comprises the compound represented by Formula 4 or 5 in an amount of 80 wt % to 99 wt % and the compound represented by Formula 6 in an amount of 1 wt % to 20 wt %.

* * * * *